Figure 1:
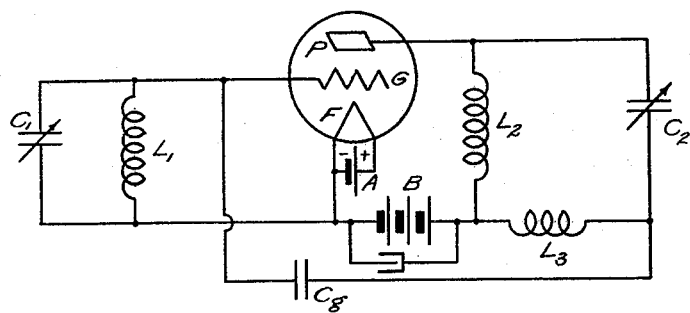

June 7, 1932. L. M. HULL 1,861,571
AMPLIFIER CIRCUIT
Filed Dec. 23, 1926

Inventor:
Lewis M. Hull
By Byrnes Townsend Brickenstein
Attorneys.

Patented June 7, 1932

1,861,571

UNITED STATES PATENT OFFICE

LEWIS M. HULL, OF BOONTON, NEW JERSEY, ASSIGNOR, BY MESNE ASSIGNMENTS, TO RADIO CORPORATION OF AMERICA, OF NEW YORK, N. Y., A CORPORATION OF DELAWARE

AMPLIFIER CIRCUIT

Application filed December 23, 1926. Serial No. 156,677.

This invention relates to an electrical amplifier circuit applicable to three or four electrode vacuum tubes, and adapted to reduce or suppress the flow of undesirable retroactive currents through the tube capacities, leads, etc.

U. S. Patent No. 1,450,080, and subsequent patents, to Hazeltine, describe a method of impressing a compensatory voltage upon the grid terminal of a three-electrode vacuum tube to oppose the retroactive voltage impressed thereon through the grid-plate capacity of the tube. This is accomplished by a capacity connected to the grid terminal, and a coil in series therewith and having substantially unity coupling in the negative sense with a coil in either the input or the output circuit of the tube. By coupling (or mutual inductance) in the negative sense I mean that species of coupling between two coils which, when the coils are connected in series, tends to produce opposite polarities at the unconnected ends of the two coils. Coupling (or mutual inductance) in the positive sense, as the term is herein used, tends to produce the same polarity at the unconnected ends of the two coils. By coupling less than substantially unity coupling in the negative sense, I mean the entire range of coupling from substantially unity negative coupling, through zero coupling, to unity coupling in the positive sense.

This system, I have found, has certain disadvantages. When a vacuum tube having high plate resistance is employed in an amplifier circuit the output circuit of the amplifier should have a correspondingly high impedance. When an amplifier circuit of the type described in the Hazeltine patents above referred to is designed to have a high output circuit impedance, I have found that, because of the necessity for close coupling between coils or for other reasons, the output circuit has also an injuriously high resistance. The necessity for a physical structure affording close coupling between coils causes dielectric losses; the fact that one coil is in the magnetic field of the other causes eddy-current losses.

I have invented a circuit which is free from these difficulties, and by means of which I obtain a high impedance resonant output circuit having a low alternating current resistance. It is applicable to three-electrode tubes, and in a novel and advantageous manner to four-electrode vacuum tubes of the type having two grid elements.

According to my invention I impress a compensatory voltage upon one element of a vacuum tube by the use of an auxiliary coil connected in series with the plate coil, and which may have any coupling therewith less than substantially unity coupling in the negative sense, but which preferably has either small coupling in the negative sense, or coupling in the positive sense with the plate coil. As at present advised, the most advantageous range of coupling is from a coefficient of coupling of about, say, 0.6 in the negative sense to a coefficient of coupling of about, say, 0.1 in the positive sense. In the case of a three-electrode vacuum tube the preferred arrangement comprises a series connection from the low potential (i. e. cathode) end of the plate coil through this auxiliary coil and a compensating condenser, to the grid. In the case of a four-electrode vacuum tube I may employ the same connection, to the control grid. I prefer, however, to omit the compensating condenser and to connect the auxiliary coil so as to impress a compensating voltage upon the emission-shield grid. The present invention then constitutes one specific means for carrying out the generic invention described and claimed in United States Letters Patent No. 1,668,151, patented May 1, 1928, on my copending application, Ser. No. 148,975, filed Nov. 17, 1926.

In either case the tuning condenser, if one is employed, may suitably be connected across both the plate coil and the auxiliary coil in series, and the compensation will be effective for all wave-lengths at which the set is intended to operate.

In the drawing, Fig. 1 represents a three-electrode vacuum tube amplifier circuit arranged according to my invention. Various types of input circuit, as for example an untuned transformer secondary, are suitable, but I may use a tuned circuit $C_1$—$L_1$ with advantage. $L_2$, connected between plate P and cathode F, constitutes the plate coil. The low potential end of $L_2$ is connected to the grid through auxiliary coil $L_3$ and compensating condenser $Cg$ in series. $L_3$ may have small coupling with $L_2$ in the negative sense, or no coupling therewith, or small coupling therewith in the positive sense. The tuning condenser $C_2$ is connected across both coils $L_2$ and $L_3$. The "A" and "B" batteries may be arranged as usual, and the latter may of course be by-passed.

Figure 2:
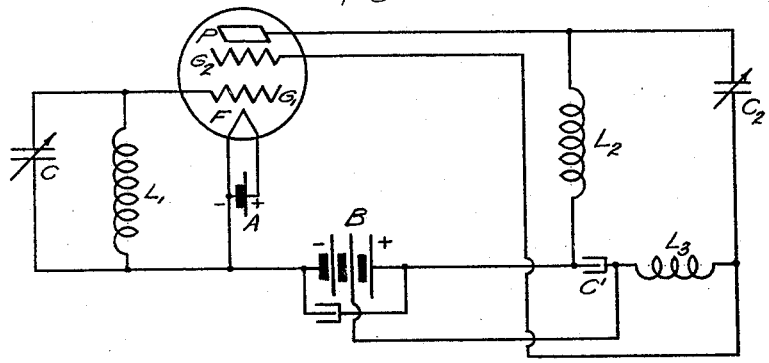

Fig. 2 shows the circuit arranged to impress a suitable potential upon the emission-shield grid $G_2$ of a four-electrode vacuum tube. The input circuit $C_1$—$L_1$ is connected between control grid $G_1$ and the cathode F. Condenser $C^1$ offers little or no impedance to alternating current, but allows grid $G_2$ to be tapped onto the "B" battery to give it the positive bias which is required when the tube is operated in this manner. The arrangement of coils $L_2$ and $L_3$ is the same as before, but the circuit makes use of the invention described and claimed in my above referred to copending application, Ser. No. 148,975, filed Nov. 17, 1926, in that the compensating voltage is applied to the emission-shield grid of the four-electrode vacuum tube.

Figure 3:
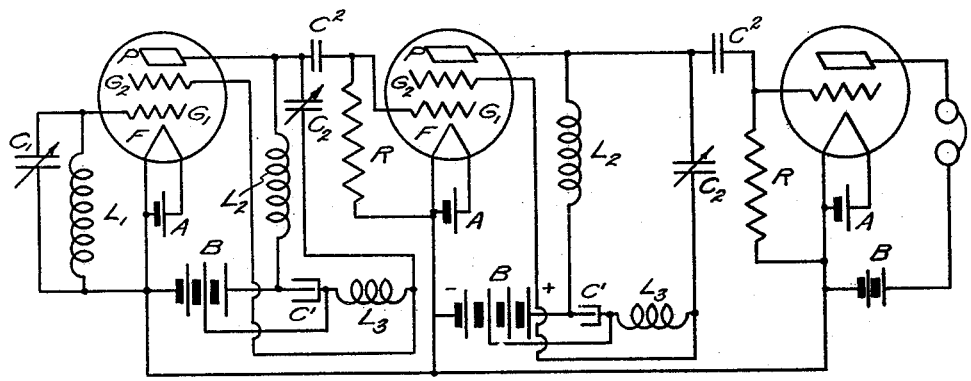

Fig. 3 shows two cascaded radio frequency amplifier stages working into a detector. Coupling between the stages may be direct as shown, isolating condenser $C^2$ and high resistances R being used in the customary manner, or may be inductive, transformers being used.

My invention extends to all arrangements in which the coils $L_2$ and $L_3$ have less than substantially unity coupling in the negative sense, no coupling, or coupling in the positive sense, thus securing the advantages already explained. At present I prefer those arrangements in which there is no coupling between the coils, or a relatively small coupling in either the positive or negative sense. The cathode is most advantageously connected to a point intermediate the two coils, and if the output circuit is tuned, the condenser may be connected across both coils in series. However, there are variations of this arrangement which fall within my invention.

I claim:

1. An electrical amplifier circuit comprising a four-electrode vacuum tube including a plate, a cathode, and two grid electrodes; an input circuit connected between said cathode and one of said grid electrodes; an output circuit connected between said plate and said cathode and including a plate coil; a source of plate potential, an auxiliary coil connected between said cathode and the second of said grid electrodes, whereby a compensating voltage is impressed upon said control grid through the inter-electrode capacity between said grids; a capacity of little impedance to alternating current between said plate and auxiliary coils and a tuning condenser connected between said plate and said second grid electrode.

2. An electrical amplifier circuit comprising a vacuum tube provided with an anode, a cathode, a control grid and a second grid; an input circuit associated with said control grid and said cathode; a tuned plate circuit including a plate coil, an auxiliary coil having less than substantially unity coupling in the negative sense with said plate coil, a capacity of negligible impedance to alternating current in series between said plate and auxiliary coils, and a tuning condenser connected across said plate coil and said auxiliary coil in series; a connection from a point intermediate said plate coil and said auxiliary coil and adjacent said capacity to the cathode system; and a neutralizing connection from a lower potential point in said tuned plate circuit to said second grid, whereby a neutralizing voltage is impressed upon said control grid through the grid-to-grid capacity of said tube.

3. In combination, a tube provided with a cathode, anode and control grid disposed adjacent said cathode, a resonant output circuit between the cathode and anode of said tube, said circuit including a variable tuning condenser and a pair of inductance coils, said coils being connected in series but being substantially uncoupled from each other, means for maintaining the junction of said inductance coils at a fixed potential, a path between said control grid and one terminal of said tuning condenser including a capacity, a second tube having its control grid connected to the remaining terminal of said tuning condenser, the control grid of said second tube being connected to a terminal of one of the coils in said resonant output circuit, and means for connecting the anode circuit of said first tube to the terminal of said last mentioned coil to which the control grid of said second tube is connected.

In testimony whereof, I affix my signature.

LEWIS M. HULL.